INVENTOR.
Raymond C. Joschko
BY
Merchant & Merchant
ATTORNEYS

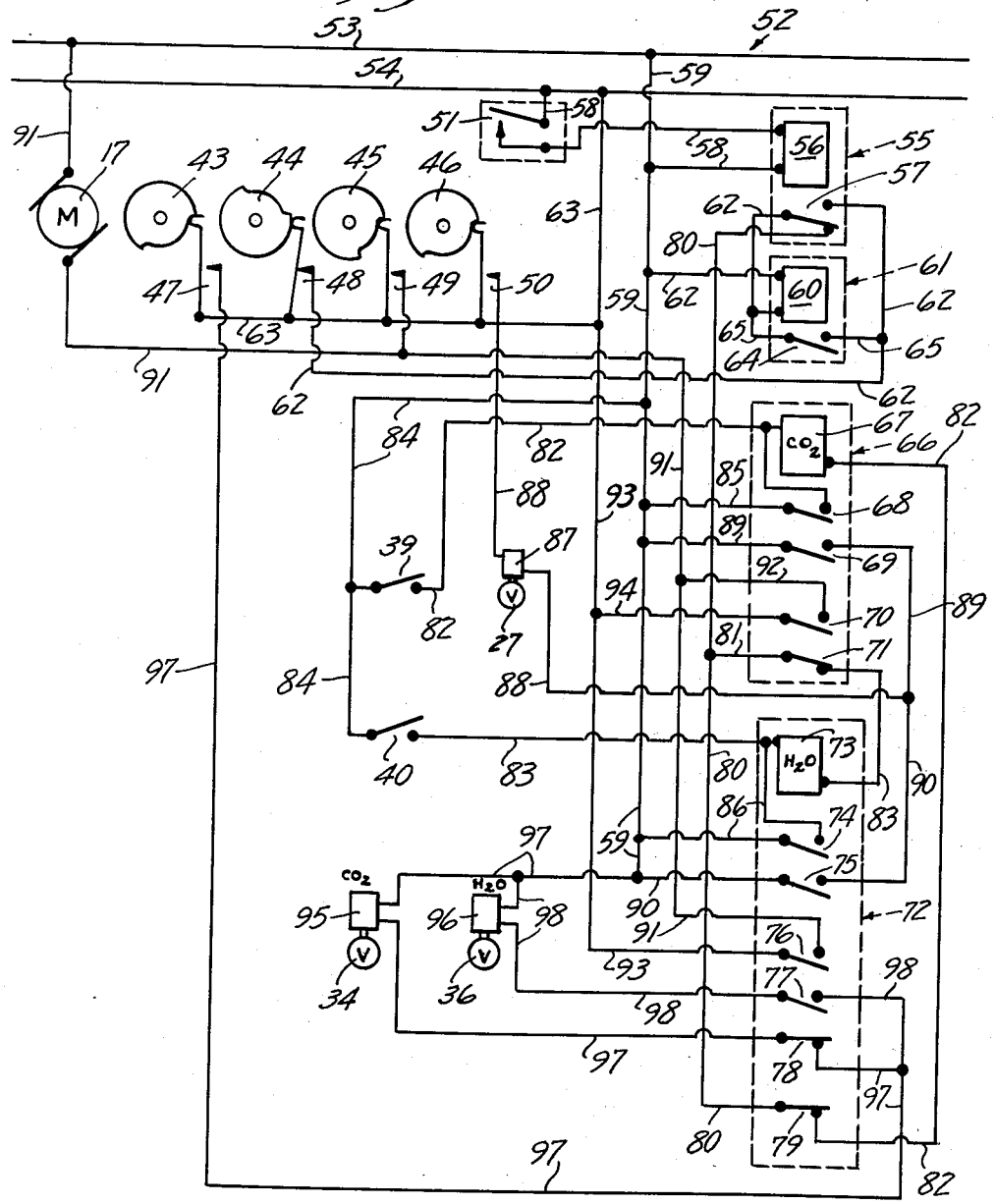

United States Patent Office 2,828,889
Patented Apr. 1, 1958

2,828,889
BEVERAGE VENDING MACHINE

Raymond C. Joschko, Minneapolis, Minn., assignor to Practical Products Company, a corporation of Minnesota Application November 1, 1954, Serial No. 466,072

3 Claims. (Cl. 222—76)

My present invention relates generally to beverage vending machines and more particularly to improvements in such machines which dispense bulk drinks utilizing flavoring ingredients with carbonated or non-carbonated water selectively.

In the making of beverages of the above type, it has been found that some fruit flavors, such as orange, cherry, grape and others, are preferred by some in a carbonated beverage, and by others in a non-carbonated beverage, such as ade. However, when some flavoring ingredients, such as for example, grape or the like, are used with non-carbonated water, the resultant beverage often has a relatively flat insipid characteristic. This is particularly true of most flavoring ingredients having flavors of fruits other than those of the citrus variety.

It has further been found that, when a small amount of an acid, such as carbonic acid, or carbon dioxide, is added to a beverage made from plain water and a flavoring ingredient such as a cherry or grape flavored syrup, the palatability of the beverage is increased to a marked degree and that the flavor of the drink is emphasized without the addition of an undue proportion of flavoring ingredient.

The primary object of my invention is the provision of a beverage vending machine which will dispense selectively beverages made from a flavoring ingredient and carbonated water or non-carbonated water; and which, when dispensing a beverage containing non-carbonated water, will add a predetermined quantity of carbonated water to the beverage insufficient to produce effervescence in the beverage.

Another object of my invention is the provision of a beverage vending machine which is responsive to payment of a coin to a coin operated mechanism and manipulation of a selector device to automatically dispense a cup to a filling zone, and to thereafter introduce flavoring ingredient and a selected water to said cup.

Another object of my invention is the provision of a beverage vending machine having a pair of selector devices and control mechanism responsive to manipulation of one of said selector devices to cause dispensing of measured quantities of flavoring ingredient and carbonated water; and responsive to manipulation of the other of said selector devices to cause dispensing of a measured quantity of flavoring ingredient, a measured relatively large quantity of non-carbonated water and a measured relatively small quantity of carbonated water.

Another object of my invention is the provision of novel means whereby, when one of said selector devices is manipulated to cause dispensing of one type of beverage, the other of said selector devices will be automatically rendered inoperative to cause dispensing of another type of beverage during the operating cycle of the machine.

A still further object of my invention is the provision of a machine of the type set forth which is relatively simple and inexpensive to manufacture, which is highly efficient in operation, and which is rugged in construction and durable in use.

The above and still further highly important objects and advantages of my invention will become apparent from the following detailed specification, appended claims and attached drawings.

Referring to the drawings, which illustrate the invention, and in which like reference characters indicate like parts throughout the several views:

Fig. 3 is a horizontal section taken substantially on the line 3—3 of Fig. 2 on an enlarged scale, some parts being removed;

Fig. 4 is a diagram illustrating the operation of my improved machine; and

Fig. 5 is a wiring diagram.

Figure 1:
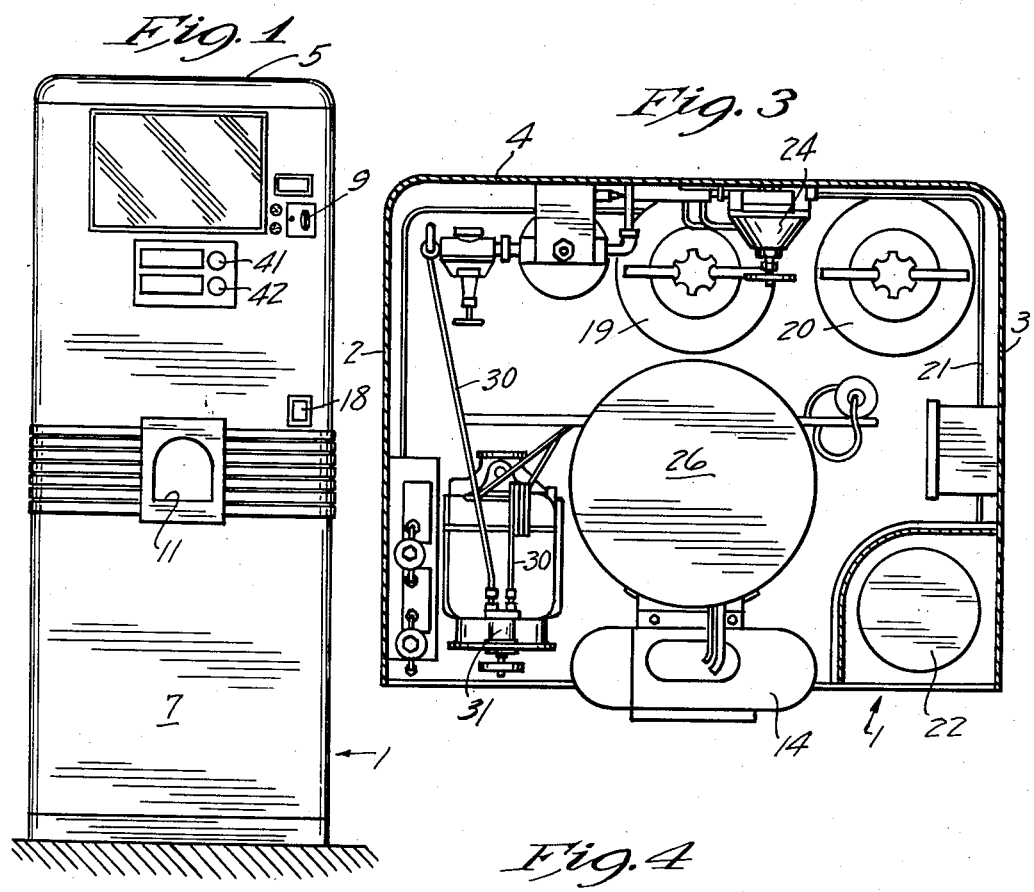
Fig. 1 is a view in front elevation of a beverage vending machine made in accordance with my invention.

My improved beverage dispensing mechanism is housed in a preferably generally rectangular cabinet, indicated in its entirety by the numeral 1. The cabinet 1 is shown as having opposed side walls 2 and 3, a back wall 4 and top and bottom walls 5 and 6 respectively. The open front of the cabinet 1 is normally closed by a door 7 hinged to the side wall 2 as indicated at 8, see Fig. 2.

Figure 2:
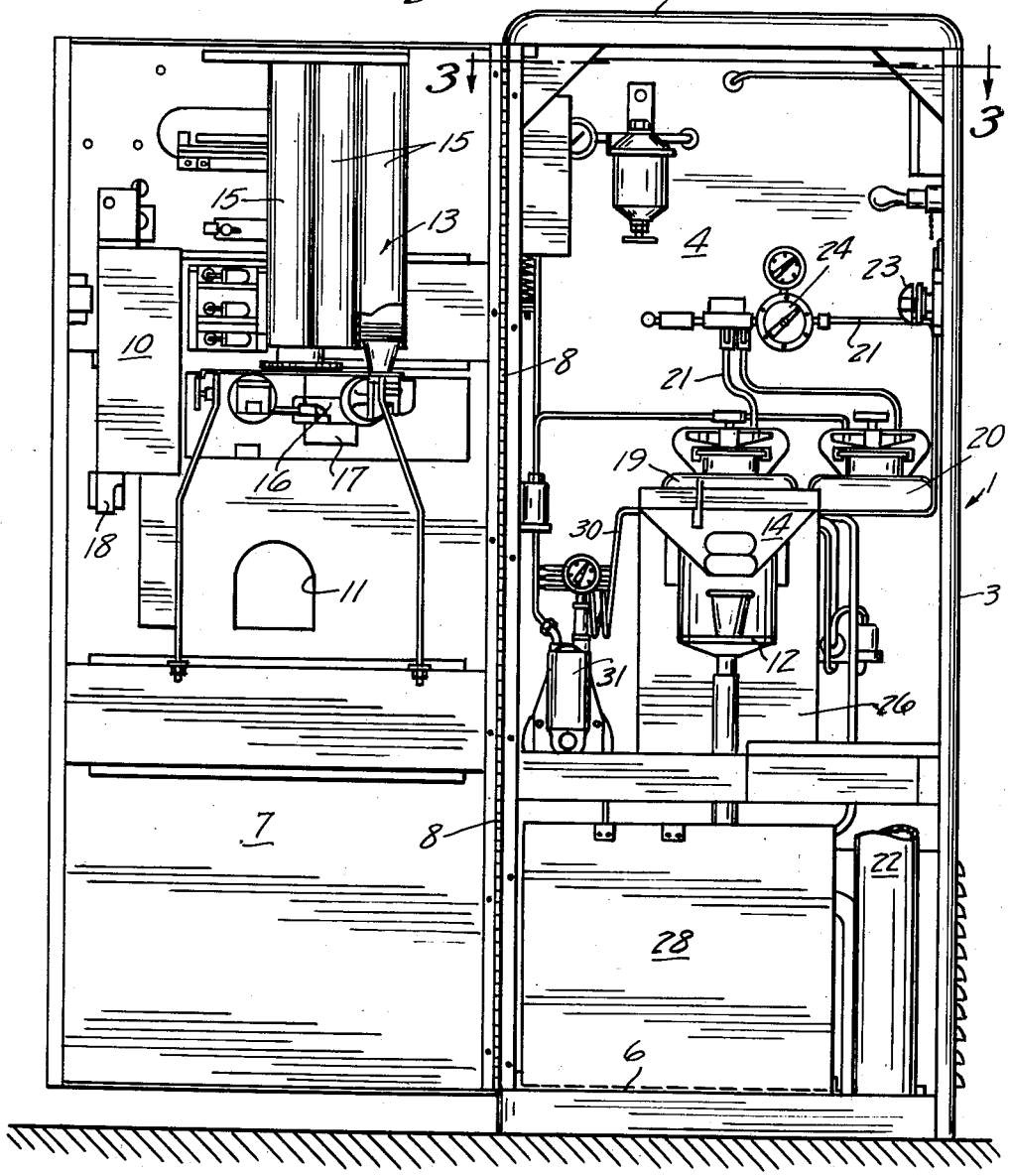
Fig. 2 is an enlarged view in front elevation of the machine of Fig. 1 showing the door thereof in an open position and exposing some of the interior mechanism thereof.

In the preferred embodiment of the invention illustrated, a coin is inserted into the coin slot 9 in the door 7, which coin slot communicates with a coin receiver and changer 10 mounted on the inner side of the door 7. After a coin is dropped into the coin slot 9, a manually operable selector is manipulated to initiate a cycle of operation of the machine. This cycle of operation comprises the delivering of a paper cup or the like to a filling zone, the dispensing of a predetermined quantity of flavoring ingredient, and a predetermined quantity of selected base liquid such as plain water or carbonated water into said cup. With reference to Figs. 1 and 2, it will be seen that the door 7 is provided with an opening 11 behind which is situated a cup supporting platform 12 which underlies a cup dispensing mechanism 13. A funnel-like element 14 guides cups discharged by the cup dispensing mechanism 13 to their proper receiving positions on the platform 12. The cup dispensing mechanism comprises a plurality of tubular cup magazines 15 and a dispensing head 16 driven by an electric motor or the like 17. With reference to Fig. 2, it will be seen that one of the magazines 15 is broken away to show the cups therein positioned to be dispensed singly to the filling zone directly behind the opening 11 in the door 7. The numeral 18 indicates a coin return chute leading from the coin return mechanism 10, see Fig. 1. The coin operated mechanism 10 may be of any of the well known commercial types which include coin operated switches, slug-rejecting mechanism and coin return mechanism. The coin changer 10 together with the cup dispensing mechanism 13, which is also conventional, do not in themselves comprise the instant invention. Hence, for the sake of brevity detailed showing and description of the same is omitted.

The cabinet 1 is adapted to contain a plurality of tanks 19 and 20 for flavoring ingredient preferably in the form of syrups. For the purpose of the present example, only the tank 19 will be considered. The container 19 is preferably connected by means of a conduit 21 to a source of gas under pressure, said source being in the nature of a storage tank 22. A manually operated valve 23 interposed in the conduit 21 controls the flow of gas from the storage tank 22 to the flavoring ingredient tank 19. Preferably, and as shown in Figs. 2 and 3, a pressure regulator valve 24 is also interposed in the conduit 21 for controlling the pressure applied to the interior of the tank 19. Also preferably, the flavoring ingredient contained in the tank 19 is in liquid form such as a syrup. The syrup is delivered to the delivery zone from the tank 19 by means of a conduit 25 which extends through a cooling tank 26 wherein the syrup is cooled before being dispensed to a cup in the delivery zone. A solenoid operated valve 27 is interposed in the syrup delivery conduit 25, see Fig. 4. The cooler or cooling tank 26 is of more or less conventional design and is operatively coupled to a refrigerating unit indicated diagrammatically at 28 in Fig. 2. As there shown, the cooler 26 overlies the refrigerating unit 28 and is located directly behind the cup guiding funnel 14.

Mounted in the cooler 26 is a carbonator 29, shown diagrammatically in Fig. 4, which is connected with a suitable source of water under pressure by means of a conduit 30. A pump 31 is interposed in the conduit 30 and supplies water to the carbonator 29 at the extreme pressure necessary for good carbonation. The pressure within the carbonator 29 is maintained at a relatively constant level by a check valve 32, see Fig. 4. A conduit 33 for carbonated water extends from the carbonator 29 to the delivery zone, and is provided with a solenoid operated valve 34 for the dispensing of carbonated water to a cup. A branch conduit 35 is connected to the water pipe or conduit 30 within the cooler 26 and extends outwardly therefrom to the delivery zone. The conduit 35, like the conduit 34, is provided with a solenoid operated valve 36 for controlling the dispensing of plain water to a cup in the delivery zone. With reference to Fig. 4 it will be seen that gas, namely, carbon dioxide gas, is supplied to the carbonator 29 from the storage tank 22 by a conduit 37 in which is interposed a pressure regulator valve 38. Thus, the carbon dioxide serves a double function—that of carbonating the water in the carbonator and that of forcing the syrup through its conduit at a predetermined pressure. The carbon dioxide gas further acts as a preservative for the syrup in its container 19.

The selection of a particular type of beverage is made by manipulation of a selected one of a pair of actuators in the nature of selector switches 39 and 40 each operated by a different one of a pair of push buttons or the like 41 and 42, preferably mounted on the door 7 of the cabinet, see Fig. 1. It may be assumed that the button 41 is operatively associated with the selector switch 39, closing of which will cause delivery of a predetermined quantity of carbonated water and flavoring syrup; the push button 42 being operatively associated with the selector switch 40 to cause delivery of flavoring ingredient, a predetermined relatively large quantity of plain water and a predetermined relatively small quantity of carbonated water. Operatively, the push button 41 and its selector switch 39 cause initiation of operation of the solenoid operated valves 27 and 34 to cause delivery of syrup and carbonated water, and the push button 42 and its respective selector switch 40 cause initiation of operation of the solenoid operated valves 27, 34 and 36 to effect delivery of a so-called non-carbonated drink as will hereinafter appear.

Upon insertion of a coin into the coin slot 9 and the selection of a particular drink by manipulation of a selected one of the push buttons 41 and 42, and prior to the dispensing of the selected drink, the motor 17 operates the cup dispensing mechanism 16 to dispense a cup into the delivery zone underlying the discharge ends of the conduits 25, 33 and 35. The entire timing of the cycle of operation is governed by a group of cams 43, 44, 45 and 46 that are motor driven at a predetermined speed preferably from the motor 17. As will hereinafter appear, the cam 43 operates a switch 47 which comprises part of a circuit for controlling the dispensing of carbonated and non-carbonated water. The cam 44 operates a setup switch 48 whereby the machine is made ready, at the end of a cycle of operation, for a subsequent cycle, dependent on the insertion of another coin in the coin slot 9. The cam 45 operates a switch 49 that is interposed in a holding circuit for the motor 17, and the cam 46 operates a switch 50 which operates to control valve 27 for the dispensing of flavoring ingredient.

A normally open, coin closed, momentary contact switch 51 comprises a part of the coin receiving and changing unit 10 and may be assumed to lie in the path of travel of a coin received by the unit 10 to be momentarily closed thereby. The switch 51 is connected to a source of power such as a two-wire conductor 52 the wires of which are indicated at 53 and 54. As shown in Fig. 5, a relay 55 comprises a coil 56 and a two-position switch 57, the coil 56 of which is connected in series with the coin operated switch 51 in a circuit comprising a lead 58 and part of a lead 59 the former of which is connected at one end to the power conductor wire 54 and the latter of which is connected at one end to the power conductor wire 53. Energization of the coil 56 of the relay 55 causes the switch 57 thereof to close a circuit through a coil 60 of a relay 61 through a circuit comprising a lead 62 connected at one end to the lead 59 and at its other end to one side of the cam operated switch 48. The relay coil 60 and the switch 57 in its relay-energized position are serially interposed in the lead 62. The circuit is completed through a portion of a lead 63 which is connected to the other side of the switch 48 and at one end to the power line 54. It will be noted that the lead 63 is connected to one side of each of the switches 47, 48, 49 and 50. Energization of the coil 60 of the relay 61 causes closing of a switch 64 which is interposed in a shunt lead 65 which cooperates with the lead 62 to form a holding circuit for the relay coil 60. As shown, the lead 65 and switch 64 in its closed position shunts out the switch 57 in its relay-energized position.

A carbonated drink control relay is shown by dotted lines in Fig. 5 and indicated in its entirety by the numeral 66. The relay 66 comprises a relay coil 67, normally open relay-closed switches 68, 69 and 70, and a normally closed relay opened switch 71. A second relay 72 comprises a coil 73, normally open coil-closed switches 74, 75, 76 and 77 and a pair of normally closed relay-opened switches 78 and 79. This relay 72 controls the dispensing of a drink utilizing flavoring ingredient and water, which for the most part is non-carbonated.

The switch 57, in its relay de-energized position is interposed in a circuit containing the relay coil 67 and another circuit containing the relay coil 73, which coils are selectively energized through the closing of their respective selector switches 39 and 40. A lead 80 extends from the switch 57 to one side of the switch 79 and has a branch lead 81 connected to one side of the switch 71. A lead 82 extends from the opposite side of the switch 79 to one end of the coil 67 of the relay 66 and from the other end thereof to one side of the selector switch 39. A lead 83 extends from the opposite side of the switch 71 to one end of the coil 73 of the relay 72, and from the other end of said coil 73 to one side of the selector switch 40. The other sides of the selector switches 39 and 40 are connected to the lead 59 by a common lead 84. Obviously, the remainder of the circuit for the relay coils 67 and 73 comprises a portion of the lead 62 between the switch 57 and the relay coil 60, the shunt lead 65 and a switch 64 therein, the cam operated switch 48 and a portion of the lead 63 extending from the switch 48 to the conductor line 54. The switches 68 and 74 comprise portions of holding circuits for their respective relay coils 67 and 73, the former being interposed in a lead 85 connected to the leads 59 and 82 in a manner to shunt out the selector switch 39 when the relay 66 is energized. Likewise, the switch 74 is interposed in a lead 86 which is connected at its opposite ends to the lead 59 and the lead 83 in a manner to shunt out the selector switch 40 when the relay 72 is energized. The switches 69 and 75 of the relays 66 and 72 respectively cooperate with the switch 50 in controlling the dispensing of flavoring ingredient to the beverage. Flavoring ingredient valve 27 is operated by a solenoid 87 that is interposed in a lead 88 that is connected to the switch 69 by a branch lead 89 which lead 89 extends from the other side of the switch 69 to the lead 59. The lead 88 is connected to the switch 75 of the relay 72 by a branch lead 90 which extends from the opposite side of the switch 75 and connected at its other end to the lead 59. The switches 70 and 76 of the relays 66 and 72 respectively operate independently to energize the motor 17. As shown, the motor 17 is interposed in a lead 91 that is connected to one side of the switch 70 by a branch lead 92. The lead 91 is connected at its other end to one side of the switch 76, the other side of which is connected to the power line 54 by a lead 93 and a portion of the lead 63. The opposite side of the switch 70 is connected to the lead 93 by a short lead 94. Thus the motor 17 is contained in a pair of parallel circuits one of which includes the switch 70 and the other of which includes the switch 76.

The normally open switch 77 and the normally closed switch 78 of the relay 72 cooperate with the cam operated switch 47 to control operation of the valves 36 and 34 respectively for the dispensing of non-carbonated water and carbonated water respectively. As diagrammatically shown in Fig. 5, the valve 34 is provided with an actuator in the nature of a solenoid 95 and the valve 36 is provided with a similar solenoid 96. The solenoid 96 and switch 78 are serially interposed in a lead 97 that is connected at one end to the lead 59 and at its other end to the switch 47. Thus, the solenoid 95 is contained in a circuit comprising the lead 59, the lead 97, the switches 78 and 47, and the lead 63, said leads 59 and 63 being connected to the opposite lines 53 and 54 respectively of the power conductor 52 as above indicated. The solenoid 96 and switch 77 are serially interposed in a lead 98 that is connected at one end to the lead 97 intermediate its connection to the lead 59 and the solenoid 95, and at its other end to the lead 97 intermediate the switches 47 and 78.

*Operation*

When the machine is in condition to initiate a cycle of operation the several cams 43, 44, 45 and 46 and their respective switches 47, 48, 49 and 50 are substantially in the positions shown in Fig. 5, the switches 47, 49 and 50 being open and the switch 48 being closed. In this position of the machine, the several relays 55, 61, 66 and 72 are de-energized.

Insertion of a coin of suitable denomination causes momentary closing of the switch 51 and consequent energization of the relay 55 to close the switch 57, thereby energizing the relay 61 to close its switch 64. The relay 55 is energized but momentarily and the same is de-energized immediately upon opening of the switch 51 after the coin has moved therebeyond. However, as above indicated, the relay 61 remains energized through its holding circuit comprising a portion of the lead 59, a portion of the lead 62, the shunt lead 65 and switch 64, and the switch 48 and a portion of the lead 63. This energization of the relay 61 and closing of its switch 64 places the circuits of the coils 67 and 73 of the relays 66 and 72 in condition to energize either of the coils 67 and 73 upon selective closing of their respective selector switches 39 and 40 by manipulation of the selector push buttons 41 or 42.

In the event that a carbonated drink is desired, the operator pushes the button 41 to close the selector switch 39 thus energizing the coil 67 of the relay 66 and causing the switches 68, 69 and 70 to close and the switch 71 to open. Inasmuch as the switch 39 is but momentarily closed by the operator, closing of the switch 68 causes the relay coil 67 to remain energized until the cam 44 is rotated sufficiently to open the switch 48 which, as above indicated, is interposed in the holding circuit for the coil 67. Closing of the switch 70 initiates operation of the motor 17 to rotate the several cams and to dispense a cup to the filling zone during the time that the switches 47, 49 and 50 are open. Then, when the cams 43, 45 and 46 rotate to a point sufficient to cause closing of their respective switches 47, 49 and 50, the solenoids 87 and 95 will be energized by closing of the switches 50 and 47 respectively to cause dispensing of water and flavoring syrup to the filling zone. During the filling period the cam 44 rotates to a point wherein its switch 48 opens whereby to break the holding circuit to the coil 60 of the relay 61 and cause de-energization of said relay 61. The motor 17 continues to rotate the cams until the switches 47, 49 and 50 thereof open, thus causing the motor 17 and valve operating solenoids 87 and 95 to be simultaneously de-energized to shut off the machine. Meanwhile, the switch 48 has been closed by its cam 44 to place the machine in condition for a subsequent cycle of operation. Obviously, the speed of rotation of the several cams and the rate of delivery of the several valves is such, that definite predetermined quantities of flavoring ingredient and carbonated water are delivered to the cup in the filling zone during a single operational cycle of the machine.

When it is desired to obtain a non-carbonated drink, a coin is inserted into the coin slot 9 whereby to momentarily close the coin operated switch 51 and cause energization of the relays 55 and 61 as above described in connection with the dispensing of a carbonated beverage. The selector button 42 is then manipulated to close the selector switch 40 whereby to cause energization of the relay 72 and the motor 17 to initiate the cycle of operation. During that period of rotation of the several cams when the switches 47, 49 and 50 are open, a cup is deposited in the filling zone. Then, when said switches 47, 49 and 50 are closed by their respective cams, flavoring ingredient and plain water are dispensed into the cup under the action of the solenoid operated valves 27 and 36 respectively. It will be noted that energization of the relay 72 causes opening of its switch 78 so that, during the major portion of the operating cycle, only non-carbonated water is supplied to the cup in the filling zone. However, as soon as the cam 44 is rotated to a point where it causes opening of its respective switch 48, the coil 73 of the relay 72 is de-energized thereby opening the switch 77 to cause closing of the valve 36, and closing of the switch 78 to cause opening of the valve 34 whereby carbonated water is dispensed into the drink. It will be further noted that de-energization of the coil 73 causes the flow of flavoring ingredient to be shut off before the end of the operating cycle. This is also true with the dispensing of a carbonated drink as above described. The arrangement of the cam 43 is such that a relatively small amount of carbonated water is dispensed into the drink as compared to the relatively large amount of non-carbonated waetr in this so-called non-carbonated drink. In practice, the amount of carbonated water dispensed into the drink is sufficiently small so as to be incapable of making an effervescent drink. This quantity is sufficient however to add a slight tang or pungency to the drink whereby to rid the same of an otherwise more or less flat or insipid quality.

When the coil 73 of the relay 72 is energized, the relay 72 is energized, the relay opened switch 79 prevents energization of the coil 67 of the relay 66 from being energized by manipulation of the selector switch 39 through the selector button 41 by the user. On the other hand, when the coil 67 of the relay 66 is energized to provide a carbonated drink, its relay opened switch 71 prevents the coil 73 of the relay 72 from being energized through manipulation of the selector switch 40 through its selector button 42 during the cycle of operation. In other words, once a particular type of beverage has been selected through the closing of one of the selector switches 39 or 40, the selected type of drink only can be dispensed from the machine during a single cycle of operation thereof.

From the above it will be seen that I have provided a machine which is capable of accomplishing the objects and advantages set forth; and while I have shown and described a commercial embodiment of my novel beverage dispensing machine, it will be understood that the same is capable of modification within the spirit and scope of the appended claims.

What I claim is:

1. In a drink vending machine; a source of non-carbonated water; a source of carbonated water; a container for a flavoring ingredient; conduits leading from the sources of carbonated water and non-carbonated water and said container to a common dispensing zone; a plurality of valves each operatively associated with a different one of said conduits for dispensing measured quantities of said waters and flavoring ingredient; circuit means for controlling the dispensing of flavoring ingredient, carbonated water and non-carbonated water; a pair of selector switches in said circuit means; mechanism for operating different ones of said valves when a given selector switch is closed; switch means controlling operation of said valve operating mechanism; and actuator mechanism for said switch means responsive to closing of one of the selector switches to energize the valve operating mechanism of the flavoring ingredient valve, the non-carbonated water valve and the carbonated water valve to cause dispensing of a predeetrmined quantity of flavoring ingredient, a predetermined relatively large quantity of non-carbonated water and a predetermined relatively small quantity of carbonated water; said actuator mechanism being responsive to closing of the other selector switch to energize the operating mechanism of said flavoring ingredient valve and said carbonated water valve to cause dispensing of a predetermined quantity of flavoring ingredient and carbonated water only.

2. The structure defined in claim 1 in which said switch means includes a pair of switches for said flavoring ingredient valve operating mechanism, each of said switches being controlled by a different one of said actuators, each of said actuators being controlled by a different one of said selector switches, said switch means further including a normally closed actuator opened switch connected to the carbonated water valve operating mechanism and a normally open actuator closed switch connected to the non-carbonated water valve operating mechanism, said normally closed and normally open switches being operated by one of said actuators.

3. In a drink vending machine; a source of non-carbonated water; a source of carbonated water; a container for a flavoring ingredient; conduits leading from the sources of carbonated water and non-carbonated water and said container to a common dispensing zone; a plurality of valves each operatively associated with a different one of said conduits for dispensing measured quantities of said waters and flavoring ingredient, each of said valves having independent electrically controlled valve operating mechanism; a pair of dispensing circuits for the flavoring ingredient valve; a mechanically operated switch common to both of said circuits; a pair of electrically operated switches one in each of said circuits; a pair of control circuits for said electrically operated switches; a second mechanically operated switch common to both of the control circuits of said pair; a pair of electrically operated switch actuators one in each of said control circuits; a pair of manually operated selector switches, one in each of said control circuits; a holding circuit for said actuators, the mechanically operated switch of said control circuit being interposed in said holding circuit; a dispensing circuit for carbonated water; a third mechanically operated switch; a normally open actuator closed switch operatively associated with one of said actuators; a dispensing circuit for non-carbonated water, said last-mentioned mechanically operated switch being interposed in said non-carbonated water dispensing circuit, a normally open actuator closed switch operatively associated with the other of said actuators and said normally closed actuator opened switch; and means for operating said mechanically operated switches at predetermined intervals relative to each other when one of said selector switches is closed to cause delivery of a drink of flavoring ingredient and carbonated water only; said mechanically operated switches and said actuators operating responsive to closing of the other of selector switches to dispense a drink comprising said flavoring ingredient, a relatively large amount of non-carbonated water and a relatively small amount of carbonated water.

References Cited in the file of this patent
UNITED STATES PATENTS

| | | |
|---|---|---|
| 2,403,470 | Tull | July 9, 1946 |
| 2,431,057 | Manning | Nov. 18, 1947 |
| 2,462,019 | Bowman | Feb. 15, 1949 |
| 2,565,084 | Parks | Aug. 21, 1951 |
| 2,660,351 | Thompson | Nov. 24, 1953 |
| 2,776,074 | St. Laurence | Jan. 1, 1957 |